United States Patent [19]

Barlet

[11] 4,325,749

[45] Apr. 20, 1982

[54] METHOD OF TREATING WELDING ROD FOR CORROSION RESISTANCE

[76] Inventor: Loren E. Barlet, 58100 Romeo Plank Rd., Mt. Clemens, Mich. 48044

[21] Appl. No.: 203,960

[22] Filed: Nov. 4, 1980

[51] Int. Cl.³ .................... C23F 7/04; B23K 35/365
[52] U.S. Cl. ................................. 148/6.14 R; 427/59
[58] Field of Search .................. 148/6.14 R; 427/59; 219/145.1, 145.41, 146.1

[56] References Cited

U.S. PATENT DOCUMENTS

| | | | |
|---|---|---|---|
| 1,342,910 | 6/1920 | Jermain | 148/6.14 R |
| 2,289,443 | 7/1942 | Mange | 148/6.14 R |
| 2,309,745 | 2/1943 | Bergin | 148/6.14 R |
| 3,677,827 | 7/1972 | Weaver | 148/6.14 R |
| 3,870,854 | 3/1975 | Vanderbroucke | 427/59 |

*Primary Examiner*—Ralph S. Kendall

*Attorney, Agent, or Firm*—John R. Benefiel

[57] ABSTRACT

A surface treatment is disclosed for welding rod or wire of ferrous composition to greatly enhance its resistance to corrosion and considerably extend shelf life. The treatment consists of forming a relatively thick (0.0001 inches) black oxide surface layer on the rod, by an aqueous alkali-nitrate immersion process, and is applied to the wire or rod after the final drawing operation in which the outside diameter of the wire or rod is sized to closely controlled tolerances to insure proper feeding in reel and other automated arc welding operations. The aqueous alkali-nitrate immersion process enables the formation of relatively thick layer of black oxide without appreciably affecting the diameter of the treated welding rod, such that mechanical working may be entirely completed prior to treatment, insuring a smooth, uninterrupted coating.

2 Claims, No Drawings

METHOD OF TREATING WELDING ROD FOR CORROSION RESISTANCE

BACKGROUND OF THE INVENTION

This invention concerns manufacture of welding rod or wire suitable for use as in Metallic Inert Gas (MIG) or Tungsten Inert Gas (TIG) welding and more particularly manufacture of steel or iron welding rod or wire. A problem has existed in the manufacture and supply of ferrous welding rod or wire in that the rod surface will, over a period of time under normal shelf conditions, develop surface formations of red oxide of iron. Such oxidation renders the welding rod unmarketable due to its appearance. If heavy oxidation occurs, the rod will be unsuitable for use due to the effect of such red oxide on the welds. The deoxidizers such as silicon and manganese normally present in the weld rod composition cannot effectively eliminate relatively large masses of red oxide, resulting in the includes thereof in the resultant weld. Also, this oxidation may interfere with proper operation of the welding rod feed equipment utilized in automated welding operations, due to the roughening of the surface and the change in diameter due to the presence of relatively gross red oxide formations. Relatively thick patches of red oxide can also prevent good electrical contact, interfering with proper functioning of arc welding equipment.

For this reason, attempts have long been made to treat the surface of the welding rod such as to increase its corrosion resistance. Such treatments have in the past included plating or coating of the wire with corrosion resistant metals. Copper plating has in the past and is currently being used for such application, which affords a degree of corrosion resistance. This approach has the disadvantage of high cost, since the process (copper phosphating) is costly and copper metal prices are often high. The copper also has a tendency to accumulate if the welded material is salvaged from welded structures which have been fabricated with the use of such copper plated welding material. If excessive amounts of copper are contained in the weld, a certain degree of embrittlement may occur. These problems are also inherent in plating the welding rod or wire with other metals such as zinc or silver.

Welding rod or wire is commonly employed in automated operations in which a feed reel mechanism causes the welding rod or wire to be advanced to the site of the weld automatically and such automated operations the feedrate of the rod or wire must be very closely controlled in order to produce acceptable weld seams. Any variations in the diameter of such welding rod or wire generally causes problems in providing proper feed, as can the surface roughness.

Accordingly, any such treatment of the welding rod must not interfere with the quality of the weld formed with the use of such rod; it should not appreciably affect the diameter of the rod such that its final finished diameter may be carefully controlled; the resultant surface finish should not result in poor electrical contact for MIG welding applications. At the same time this treatment should provide a high degree of corrosion resistance for the purposes outlined above.

U.S. Pat. No. 3,870,854 to Vandenbroucke discloses a treatment which is intended to solve the corrosion problem. The treatment consists of a heat treat or furnace generated black oxide surface coating of the welding rod or wire, achieved by placing the welding rod, after the primary manufacturing steps, into an annealing oven and holding such welding rod at relatively elevated temperatures to encourage the formation of black iron oxide. As disclosed in that patent, the resultant very thin black oxide coating does not appreciably affect the diameter of the welding rod and in addition the black oxide material provides a relatively smooth uninterrupted surface which does not interfere with the feed and/or the electrical connection necessary for arc welding applications. The treatment yields an extremely thin coating of black oxide, i.e., the patent specification describes a coating of less than 3 millimicrons thickness.

There are several disadvantages to this approach: This extremely thin layer cannot provide a high degree of corrosion resistance, albeit some improvement over untreated metal is possible. The annealing operation constitutes a relatively time consuming manufacturing step and also produces a heat induced hardening of the outer surface of the layer, creating a relatively brittle outermost layer. This brittleness creates a tendency to produce cracking of the protective layer and lessening the protection afforded.

Accordingly, it is an object of the present invention to provide a surface treatment for ferrous welding rod or wire resulting in a high degree of corrosion resistance to thereby greatly extend the shelf life of the welding rod or wire.

It is another object of the present invention to provide such surface treatment which does not appreciably affect the diameter of the welding rod or wire.

It is still another object of the present invention to provide such surface treatment in which the resultant weld produced by such treated welding rod or wire is unaffected such as to enable high quality welds to be produced while affording the corrosion resistance protection.

It is yet another object of the present invention to provide such treatment of welding rod in which the cost of manufacturing such welding rod is not substantially increased.

A further object is to provide such protection while not interfering with good electrical contact for arc welding applications.

SUMMARY OF THE INVENTION

These and other objects of the present invention, which will become apparent upon a reading of the following specification and claims, are achieved by treating steel welding rod or wire with an aqueous alkali-nitrate immersion process which generates a relatively thick layer of black iron oxide ($Fe_2O_3$), on the order of 0.0001 inches, but which does not affect either the quality of the weld or the surface electrical conductivity. This treatment is applied after the welding rod is drawn to its final diameter, such that the coating is smooth and uninterrupted. The aqueous alkali-nitrate solution reacts with the iron chemically, converting the outer layer of the rod to black oxide. A small volume of the iron passes into solution in the aqueous alkali-nitrate bath such that the slight increase in volume due to conversion of the iron material to black oxide is substantially offset by the loss in volume occurring as a result of the iron passing into solution. The net effect being that diameter of the treated rod is uniform and extremely close to the diameter of the rod achieved in the final drawing operation. The black oxide coating so produced is smooth and uniform and exhibits a highly asthetic appearance. The corrosion resistance of the treatment is of a high degree, far surpassing other common treatments for such welding rods such as the copper plating and heat treat black oxidizing thereof described above. The black oxide itself provides a good conductive surface for electrical welding applications, and is efficiently eliminated by the deoxidizers contained in the welding rod such that superior welds are produced.

DETAILED DESCRIPTION OF THE PREFERRED EMBODIMENT

In the following detailed description a specific example will be set forth in accordance with the requirements of 35 U.S.C. 112. It is to be understood, however, that the same is not intended to be limiting and indeed should not be so construed inasmuch as the invention is capable of taking many forms and variations within the scope of the appended claims. As briefly described above, the central concept of the present invention is to provide a surface treatment of ferrous alloy welding rod or wire with an aqueous alkali-nitrate immersion process which provides a relatively thick black oxide coating by conversion of the iron at the surface of the rod to the black oxide form of $Fe_2O_3$. Such aqueous alkali-nitrate processes are well known (in other contexts) and suitable such treatments commercially available. Such processes are constituted by immersion of the welding rod in a heated, highly alkaline solution containing strong oxidizers for a timed interval sufficient to produce the desired thickness of black oxide surface layer. The process also commonly includes a pretreatment with a hot alkali cleaning agent and a subsequent water rinses to remove drawing compounds and so-called "mill scale" prior to immersion in the blackening tank. The aqueous solution is heated to temperature levels on the order of 280°-285° F. Proprietary salts are commercially available which contain various ingredients for optimizing the process.

One suitable such material is sold under the "Black Magic Plus" trademark by the Mitchell-Bradford Chemical Company, 160 Wampus Lane, Milford, CT 06460.

An important aspect of the present invention is that the mechanical working manufacturing steps are completely carried out prior to the black oxide coating process, i.e., the stock is drawn to a closely controlled required diameter in the drawing operation. This yields a bright smooth surface finish and uniform close tolerance diameter, suitable for automated feed mechanisms. This approach is possible since while a relatively thick coating is applied, the final diameter of the welding rod is not appreciably changed due to phenomenon peculiar to such aqueous alkali-nitrate black oxide process. That is, the outer region of the rod is converted to iron black oxide ($Fe_2O_3$), resulting in a tight, dense coating on the surface thereof. While there is a slight increase in volume of the iron as the chemical reaction to iron oxide takes place, the solution itself dissolves a slight portion of the iron, which tends to offset the increase in volume associated with the conversion of iron into iron oxide. Accordingly, the net result is an extremely minute increase in diameter on the order of several millionths of an inch, by the coating process. This despite the preferred thickness of the resultant black oxide coating being on the order of 0.0001 of an inch.

Accordingly, the mechanical manufacturing steps can be completed prior to the coating of the welding rod and subsequent mechanical processing is not required, such that the resultant finish remains smooth and uninterrupted to maximize the effectiveness of the treatment in achieving resistance to corrosion.

EXAMPLE:

Ferrous base rod stock of H-12 tool steel containing manganese and silicon was drawn to a diameter of 5/32 of an inch. Lengths of the rod stock was subjected to a cleaning treatment to remove mill scale and drawing compounds, such treatment consisting of hot alkali bath and a subsequent water rinse. The rod was then immersed in an aqueous solution containing a recommended concentration of 5½ lbs. per gallon of activated "Black Magic Plus" oxidizing salts, heated to a temperature of 280°-285° F. The immersion time was approximately thirty minutes. The sample was removed and rinsed in a cold water rinse. A 36 inch length was then examined by taking four sample sections 9 inches apart. Chemical analysis revealed a coating of black iron oxide, and metallographic examination indicated a thickness of 0.0001 inch on each sample section. Photomicrographs revealed a substantially uniform smooth coating.

Samples so manufactured were utilized in various welding processes: (1) Tig- Tungsten Inert Gas Welding; (2) Mig-Metallic Inert Gas Welding; (3) Gas Oxy-Acetylene Welding. All of the welds produced were of excellent quality.

COMPARATIVE FIELD TESTING FOR CORROSION RESISTANCE UNDER YARD (OUTDOOR) CONDITIONS

This test, for comparison purposes, included sample "A", a copper plated length of welding rod 36 inches long, ⅛ in diameter; sample "B", a furnace oxidized length (36×⅛ inch) of such welding rod treated generally in accordance with the process described in the Vandenbroucke patent identified above; and sample "C", a 36×5/32 inch tool steel welding rod treated according to the process described above. The following is the result of such 20-day test based on visual inspection of each of the samples, A, B, and C.

END OF THE FIRST DAY
   A. Free from visible corrosion
   B. Red Oxide starting
   C. Free from visible corrosion
SECOND DAY
   A. Free from visible corrosion
   B. Further red oxide visible
   C. Free from visible corrosion
THIRD DAY
   A. Starting to show signs of red oxide
   B. Almost solid red oxide 95%
   C. Free from visible corrosion
FOURTH DAY
   A. 75% covered red oxide
   B. Completely covered red oxide
   C. Free from visible corrosion
FIFTH DAY
   A. 75% covered red oxide
   B. Completely covered red oxide
   C. Free from visible corrosion
SIXTH DAY
   A. 75% covered red oxide
   B. Completely covered red oxide
   C. Free from visible corrosion
SEVENTH DAY
   A. 80% covered red oxide
   B. Completely covered red oxide C. Free from visible corrosion
EIGHTH DAY
  A. 85% covered red oxide
  B. Completely covered red oxide
  C. Free from visible corrosion
NINETH DAY
  A. 85% covered red oxide
  B. Completely covered red oxide
  C. Free from visible corrosion
TENTH DAY
  A. 95% covered red oxide
  B. Completely covered red oxide
  C. Free from visible corrosion
ELEVENTH DAY
  A. 95% covered red oxide
  B. Completely covered red oxide
  C. Small spot red oxide
TWELFTH DAY
  A. 95% covered red oxide
  B. Completely covered red oxide
  C. Several small (pin-head sized) red oxide spots
THIRTEENTH DAY
  A. 96% covered red oxide
  B. Completely covered red oxide
  C. Several small (pin-head sized) red oxide spots
FOURTEENTH DAY
  A. 97% covered red oxide
  B. Completely covered red oxide
  C. Several small red oxide spots
FIFTEENTH DAY
  A. 97% covered red oxide
  B. Completely covered red oxide
  C. Several small red oxide spots
SIXTEENTH DAY
  A. 97% covered red oxide
  B. Completely covered red oxide
  C. Several small red oxide spots
SEVENTEENTH DAY
  A. 97% covered red oxide
  B. Completely covered red oxide
  C. Several small red oxide spots
EIGHTEENTH DAY
  A. 97% covered red oxide
  B. Completely covered red oxide
  C. Several small red oxide spots
NINETEENTH DAY
  A. 97% covered red oxide
  B. Completely covered red oxide
  C. Several small red oxide spots
TWENTIETH DAY
  A. 97% covered red oxide
  B. Completely covered red oxide
  C. Several small red oxide spots
TEST ENDED: Twentieth Day Sample A 96–97% covered with red iron oxide copper coated material. Sample B 100% red oxided in 6 days. Test Sample C only six small spots the size of a pin-head in twenty days.

It can be appreciated that the above-recited objects of the present invention are achieved by the treatment according to the present invention. A relatively high degree of corrosion resistance is provided by the treatment of the ferrous welding rod in immersion in an aqueous alkali-nitrate solution producing a relatively thick uniform coating. The characteristic of such treatment does not increase appreciably the diameter of the rod and enables the complete manufacturing steps to be conducted prior to the treatment such that the mechanical injury to the surface treatment is avoided to further enhance the corrosion resistance and attractiveness of the surface finish. The black oxide material does not interfere with electrical contacts with the production of excellent welds, and provides a smooth and uniform diameter of the welding rod such as to allow reliable use with automated feed equipment. At the same time such treatment, being commercially available at relatively low cost, does not add substantially to the manufacturing cost of producing the welding rod.

Having thus described the invention, what is claimed is:

1. A method of manufacturing ferrous base welding rod or wire comprising the steps of drawing steel alloy stock to a finished diameter and subsequently treating said welding rod to generate a black oxide coating, said treatment including the step of immersing said welding rod in an aqueous alkali-nitrate solution, to produce a thickness of black oxide coating on the order of 0.0001 inches.

2. The method according to claim 1 wherein said steel alloy is a tool steel containing silicon and manganese.

* * * * *